United States Patent [19]
Usui et al.

[11] 3,761,112
[45] Sept. 25, 1973

[54] VEHICULAR SAFETY SYSTEM

[75] Inventors: Keizaburo Usui; Takashi Haruna, both of Yokosuka, Japan

[73] Assignee: Nissan Motor Company, Limited, Yokohama City, Japan

[22] Filed: June 16, 1971

[21] Appl. No.: 153,644

[30] Foreign Application Priority Data
June 26, 1970 Japan.............................. 45/55719

[52] U.S. Cl. ...................... 280/150 AB, 220/9 LG
[51] Int. Cl. ........................................... B60r 21/08
[58] Field of Search........................... 280/150 AB; 220/9 LG

[56] References Cited
UNITED STATES PATENTS

| | | |
|---|---|---|
| 3,532,360 | 10/1970 | Leising et al................. 280/150 AB |
| 3,549,169 | 12/1970 | Oldberg........................ 280/150 AB |
| 3,606,377 | 9/1971 | Martin.......................... 280/150 AB |
| 3,532,359 | 10/1970 | Teague et al................. 280/150 AB |
| 3,491,910 | 1/1970 | Buckwalter et al. ............. 220/9 LG |

Primary Examiner—Kenneth H. Betts
Assistant Examiner—John P. Silverstrim
Attorney—Robert E. Burns et al.

[57] ABSTRACT

A vehicular safety system for use in a vehicle having an inflatable bag for protecting a vehicle occupant from injury when a collision occurs. The safety ststem uses chemical explosives for explosively producing hot gases upon detection of the collision condition. The hot gases produced are introduced into the inflatable bag to provide an inflated shock-absorbing bag in front of the occupant. Thermal means is provided in the safety system for protecting the inflatable bag from thermal damage by the hot gases.

15 Claims, 5 Drawing Figures

VEHICULAR SAFETY SYSTEM

This invention relates to a vehicluar safety system and more particularly to a vehicular safety system having an inflatable bag for protecting a vehicle occupant from injury when a collision occurs.

As is often experienced in a collision of an automotive vehicle, vehicle occupants are violently flung forward and, in the worst case, are thrown out of their seats by a strong force of inertia due to a sudden deceleration of the vehicle. This invites a critical physical injury to the occupant and, thus, protection of the occupants from such injury is a matter of great concern to the automotive industry. For this purpose, a vehicular safety system is proposed using chemical explosives for providing an inflated bag between a vehicle occupant and structural parts of an automotive vehicle. This inflated bag acts as a buffer or shock-absorber for protecting the occupant involved in the collision.

The chemical explosives used as a gas generator explosively produce hot gases upon detection of, for example, a sudden deceleration or impact due to the collision. The hot gases produced at an initial stage of the collision are then instantaneously introduced into an inflatable bag which is normally deflated and which may be snugly stored in a body of the vehicle. Thus, an inflated bag is provided in front of the vehicle occupant to absorb mechanical shocks which otherwise bitterly injure the occupant.

As is well known, the vehicular safety system using chemical explosives has a prominent advantage that it can supply a sufficient amount of gases to an inflatable bag within a limited period of time after it detects a collision condition. The use of such explosives, however, invites an inevitable problem resulting from the fact that the temperature of the gas produced is enormously high and usually exceeds 1,000° C. For this reason, selection of the material used for the inflatable bag is extremely restricted in its variety available. Therefore, a special material having an excellent heat resistivity must be called for in such a conventional practice, even sacrificing mechanical strength or endurance against a high pressure prevailing in an inflated bag obtained. As a consequence, the inflated bag is liable to burst up to blow out the confined hot gases which might cause a burn to the occupant and/or make a fire in a occupant space of the vehicle.

It is, therefore, an object of this invention to provide a vehicular safety system having an inflatable bag for protecting a vehicle occupant from injury when a collision occurs.

Another object is to provide a vehicular safety system free from thermal damage by hot gases produced by explosion of chemical explosives.

According to a main feature of this invention, a vehicular safety system of the invention comprises an inflatable bag disposed in use in a vehicle for protecting a vehicle occupant from injury when a collision occurs, chemical explosives for producing hot gases introduced into the inflatable bag, control means for initiating explosion of the explosives when a collision occurs, and thermal means for protecting the inflatable bag from thermal damage by the hot gases. The thermal means includes in an embodiment cold gas discharging means for discharging relatively cold gases concurrently of introduction of the hot gases into the inflatable bag. In another embodiment, the cold gases are directly discharged into the inflatable bag to be mixed with the hot gases. In still another embodiment the thermal means includes a heat resisting agent member applied to the inflatable bag for thermally insulating the bag from the hot gases.

Figure 1:
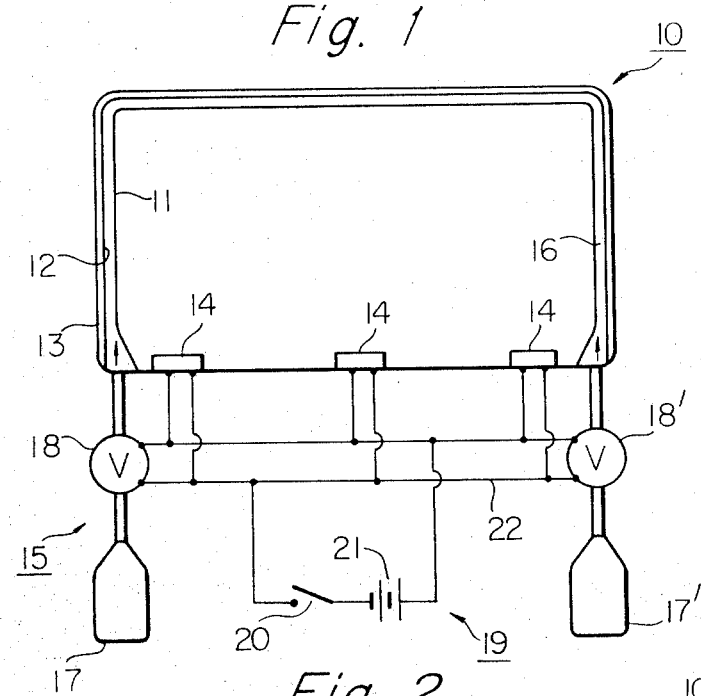
FIG. 1 is a partially sectional view showing a vehicular safety system according to the invention.

Referring now to FIG. 1, a vehicular safety system 10 of this invention is shown to have an inflatable bag under an inflated or expanded condition. The inflatable bag is composed of three skin members 11, 12 and 13 for admitting hot gases thereinto. These hot gases are produced by explosion of chemical explosives 14 accommodated in the inflatable bag. The inner skin member 11 is made of a heat resisting material such as a rubber and is capable of hermetically confining the hot-gases. The intermediate skin member 12, which is of hermetical property, covers the inner skin member 11. The outer skin member 13 covering the intermediate skin member 12 reinforces the inflatable bag as a whole to prevent excessive inflation, which might result in bursting of the inflatable bag, and, therefore, is made of mechanically strong and flexible material such as a woven fabric.

Cold gas discharging means 15 is also provided in the safety system 10 for protecting the skin members 11, 12 and 13 from being thermally damaged by heat energy in the hot gases. This cold gas discharging means 15 is equipped with at least one container containing relatively cold gases as a coolant under a pressure and with a suitable number of valves respectively having an inlet connected with the corresponding container and an outlet connected with a space 16 between the inner skin member 11 and the intermediate skin member 12. By way of example, there are shown two sets of containers 17 and 17' and corresponding valves 18 and 18'.

In order to initiate opening of the valves 18 and 18' concurrently of the admission of the hot gases, a control system 19 used in this invention includes a normally open switch 20 and an energy source 21 electrically connected with the switch 20. With an electrical connection 22 including the switch 20 and energy source 21 are electrically connected the two valves 18 and 18' in parallel with each other. These valves 18 and 18' may be of usual electromagnetic type or of the type that has a sealing (not shown) releasable by explosion of explosives (not shown) attached thereto. In the latter type, the ignition of the explosives is initiated by closing the switch 20. On the other hand, the explosives 14 for producing hot gases have also igniters (not shown) electrically connected with the electrical connection 22 in parallel with the valves 18 and 18'. In this instance, the switch 20 is adapted to be closed upon detection of a sudden deceleration or impact exceeding a predetermined level due to a collision of the automotive vehicle.

When, in operation, the automotive vehicle equipped with the safety system 10 of the invention is subjected to a sudden impact of a given magnitude exceeding a predetermined level, the switch 20 is closed to supply electrical energy from the energy source 21 to the explosives 14 and the valves 18 and 18'. Upon energization, the explosives 14 are ignited to suddenly generate hot gases all at once, and, concurrently, the valves 18 and 18' are opened to pass therethrough cold gases from the containers 17 and 17' to the space 16 between the inner skin member 11 and the intermediate skin member 12. In this way, although the inside surface of the inner skin member 11 is exposed to the generated hot gases, the inner skin member 11 is free from being thermally damaged. This is because a considerable heat flow due to the steep temperature gradient between the inside and outside surfaces of the inner skin member 11 will effectively reduce the surface temperature of the particular skin member 11.

In this instance, the outer skin member 13 for reinforcement may be dispensed with if the intermediate skin member 12 has a sufficient mechanical strength. On the other hand, carbon dioxide, nitrogen or air may be used as the coolant cold gases.

Figure 2:
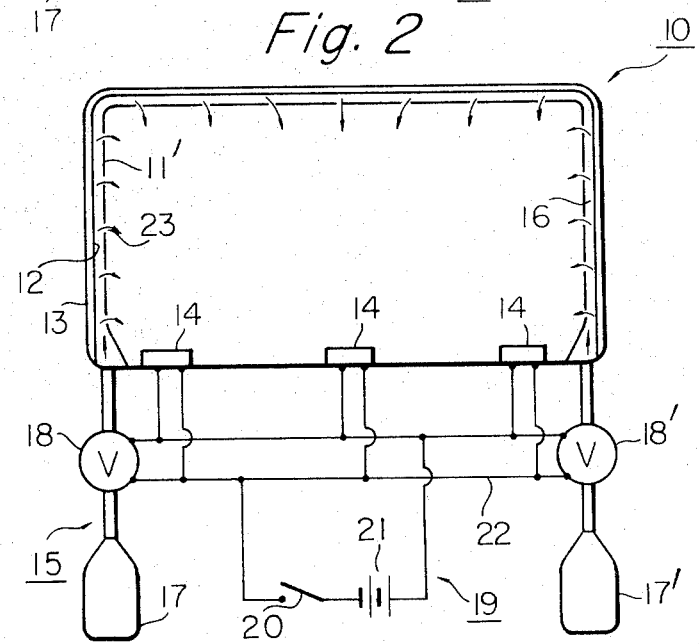
FIG. 2 is a partially sectional view showing another embodiment of the vehicular safety system of the invention.
Figure 3:
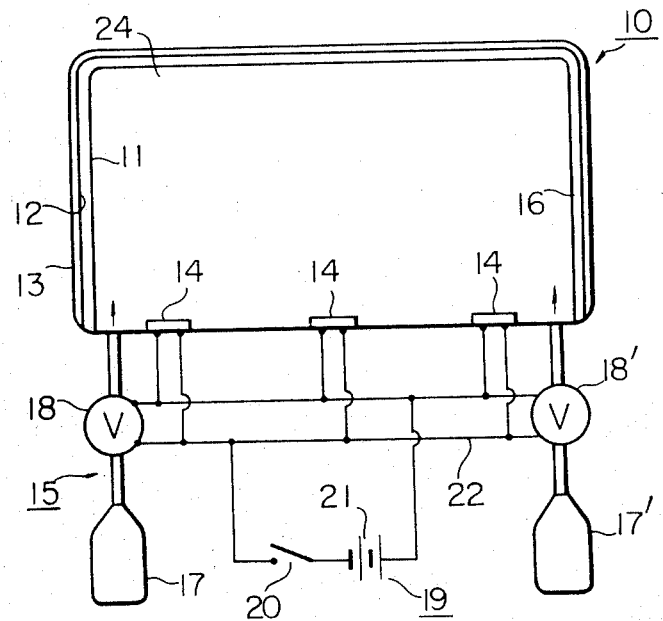
FIG. 3 is similar to FIGS. 1 and 2 but shows still another embodiment of the invention.

Turning to FIGS. 2 and 3, there are shown other examples of this invention, in which like numerals indicate counterparts of elements shown in FIG. 1. Since these examples resemble that of FIG. 1, description will be limited to different points. In FIG. 2, an inner skin member 11' is formed with a number of pores 23. As a result, these pores 23 permit in operation the coolant cold gases to pass therethrough to be mixed with the hot gases so that an improved cooling effect is obtained. As to the example of FIG. 3, it will suffice to explain that the cold gases are directly discharged into a space 24 defined by the inner skin member 11 and are mixed with the hot gases to reduce the temperature of the whole gas mixture. In either example, the outer skin member 13 may also be dispensed with.

Figure 4A:
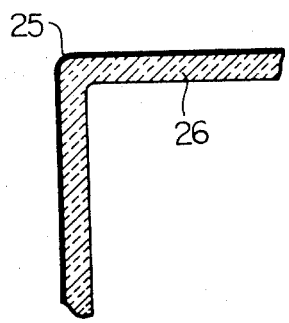
FIGS. 4A and 4B are enlarged sectional views showing a further embodiment of the safety system.
Figure 4B:
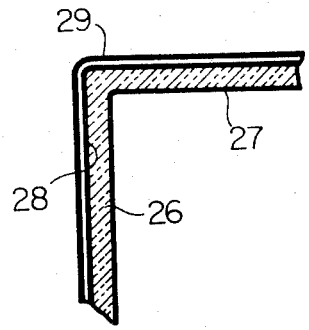

Similar thermal protection can be accomplished by using a heat resisting agent. This example will be described with reference to FIGS. 4A and 4B. If the inflatable bag is composed of a single skin member 25, as shown in FIG. 4A, then the heat resisting agent 26 is applied to the inside surface of the skin member 25. On the other hand, the inflatable bag is composed of three skin members 27, 28 and 29 similarly to those of FIG. 1, as shown in FIG. 4B, then the heat resisting agent 26 is disposed between the inner skin member 27 and the intermediate skin member 28. In this example, the outer skin member 29 may also be dispensed with.

It should be understood that prominent thermal protection effect is available if those examples heretofore explained are combined with each other. After detailed discussion of the respective examples, explanation of those combinations will be superfluous and, hence, be omitted.

What is claimed is:

1. A safety system for use in a motor vehicle for protecting a vehicle occupant from injury by a collision of the vehicle, comprising an inflatable bag normally held in a deflated condition and inflatable between said occupant and a structural part of said vehicle, explosive means in communication with said inflatable bag for producing hot gases for inflating said inflatable bag to protect said occupant, cold gas discharging means discharging cold gas close to a wall of said inflatable bag thereby forming a layer of cold gas for protecting said inflatable bag from damage by the heat of said hot gases, and means for simultaneously initiating explosion of said explosive means and discharging of said cold gas by said cold gas discharging means in response to a collision of said vehicle with another object.

2. A safety system according to claim 1: wherein said bag comprises an inner layer and an outer layer enclosing said inner layer; and said cold gas discharging means comprises means for discharging cold gas between said inner layer and said outer layer when said explosive means inflates said bag with hot gas.

3. A safety system according to claim 2: wherein said inner layer is made of a material impervious to hot gas.

4. A safety system according to claim 2: including means defining a plurality of apertures in said inner layer for passing therethrough said cold gas.

5. A safety system according to claim 2: wherein said bag includes another layer enclosing said inner layer and said outer layer for reinforcing said inner layer and said outer layer.

6. A safety system according to claim 5: wherein said another layer comprises a layer made of a woven fabric.

7. A safety system according to claim 1: including a layer of heat insulating material disposed on said bag.

8. A safety system according to claim 7: wherein said heat insulating material is disposed on an internal surface of said bag.

9. A safety system according to claim 1: wherein said bag comprises an inner layer and an outer layer enclosing said inner layer; and including a layer of heat insulating material disposed between said inner layer and said outer layer.

10. A safety system according to claim 9: wherein said bag includes another layer enclosing said inner layer and said outer layer for reinforcing said inner layer and said outer layer.

11. A safety system according to claim 10: wherein said another layer comprises a layer made of a woven fabric.

12. A safety system according to claim 1: wherein said cold gas discharging means comprises means for discharging cold gas close to an internal surface of said bag.

13. A safety system for protecting an occupant of a vehicle during a collision of the vehicle comprising: an inflatable bag normally stored in a collapsed condition when deflated and inflatable and expansible to a position between a vehicle occupant and the vehicle; actuatable inflating means in communication with the bag interior for inflating said bag with hot gas when actuated; actuatable cold gas discharging means for discharging cold gas along surface portions of said bag when actuated; and actuating means for actuating simultaneously said inflating means and said cold gas discharging means when the vehicle collides with another object.

14. A safety system according to claim 13: wherein said actuating means comprises a source of electrical energy, means connecting said source of electrical energy and said cold gas discharging means in parallel circuit relation, means connecting said inflating means and said cold gas discharging means in parallel circuit relation, and switching means connected in series circuit relation to said source of electrical energy and operable in response to a collision of the vehicle for switching electrical energy to said cold gas discharging means and said inflating means for actuating simultaneously said cold gas discharging means and said inflating means.

15. A safety device according to claim 13: wherein said cold gas discharging means comprises means for discharging cold gas close to a wall of said bag thereby forming a layer of cold gas close to said wall.

* * * * *